Figure 9:
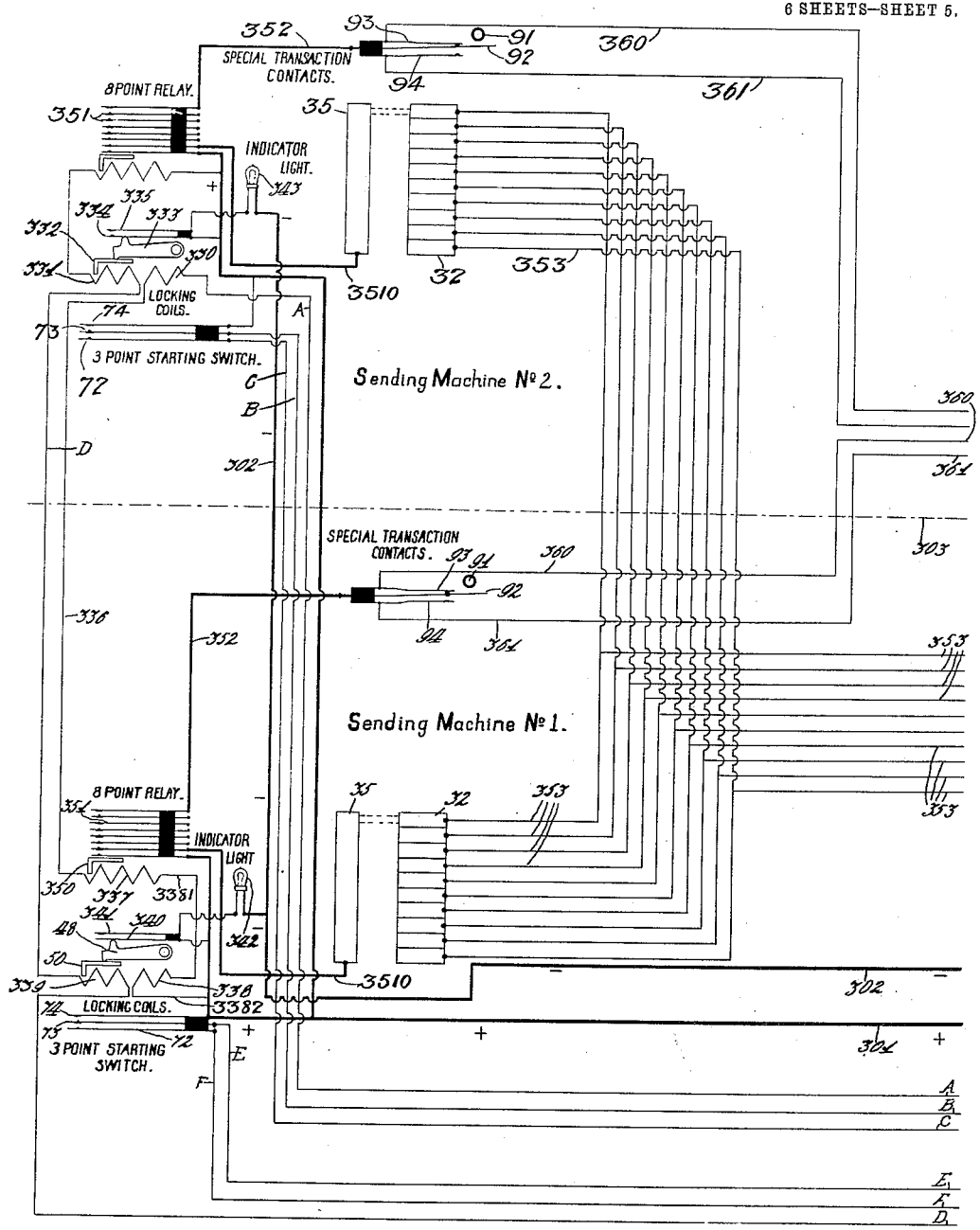

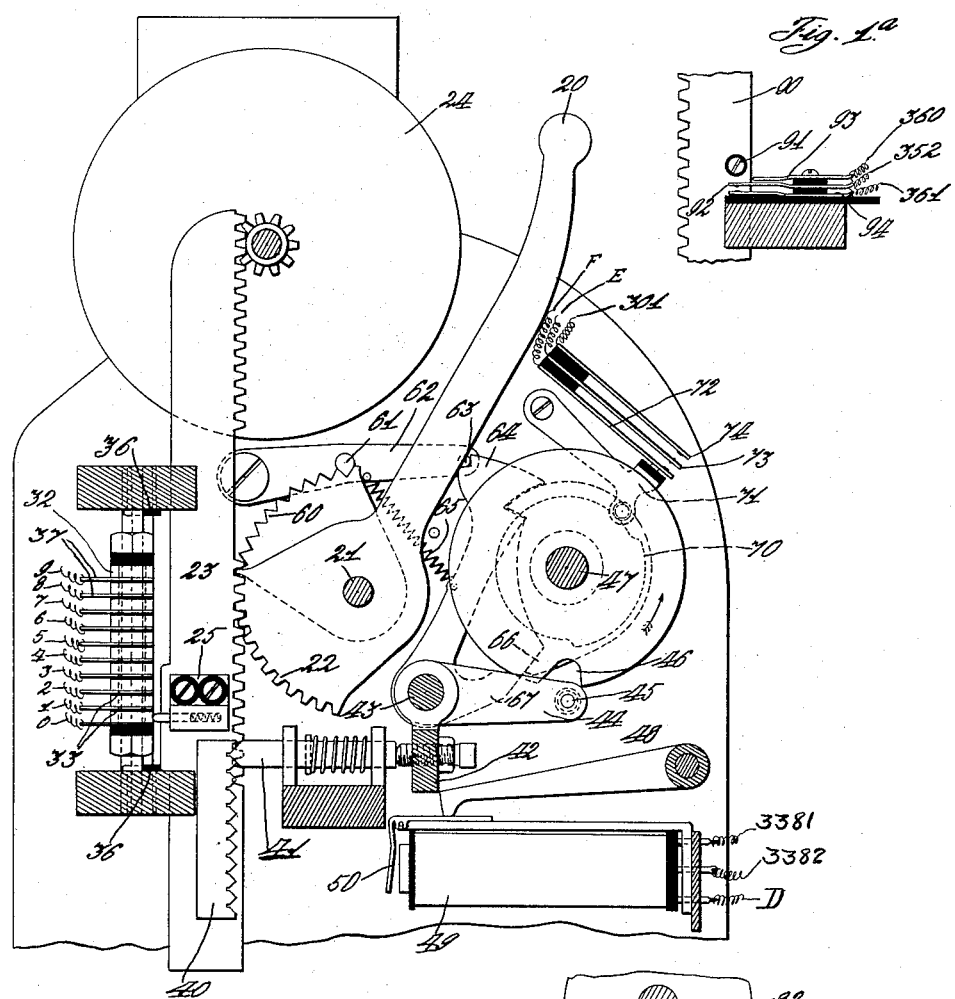

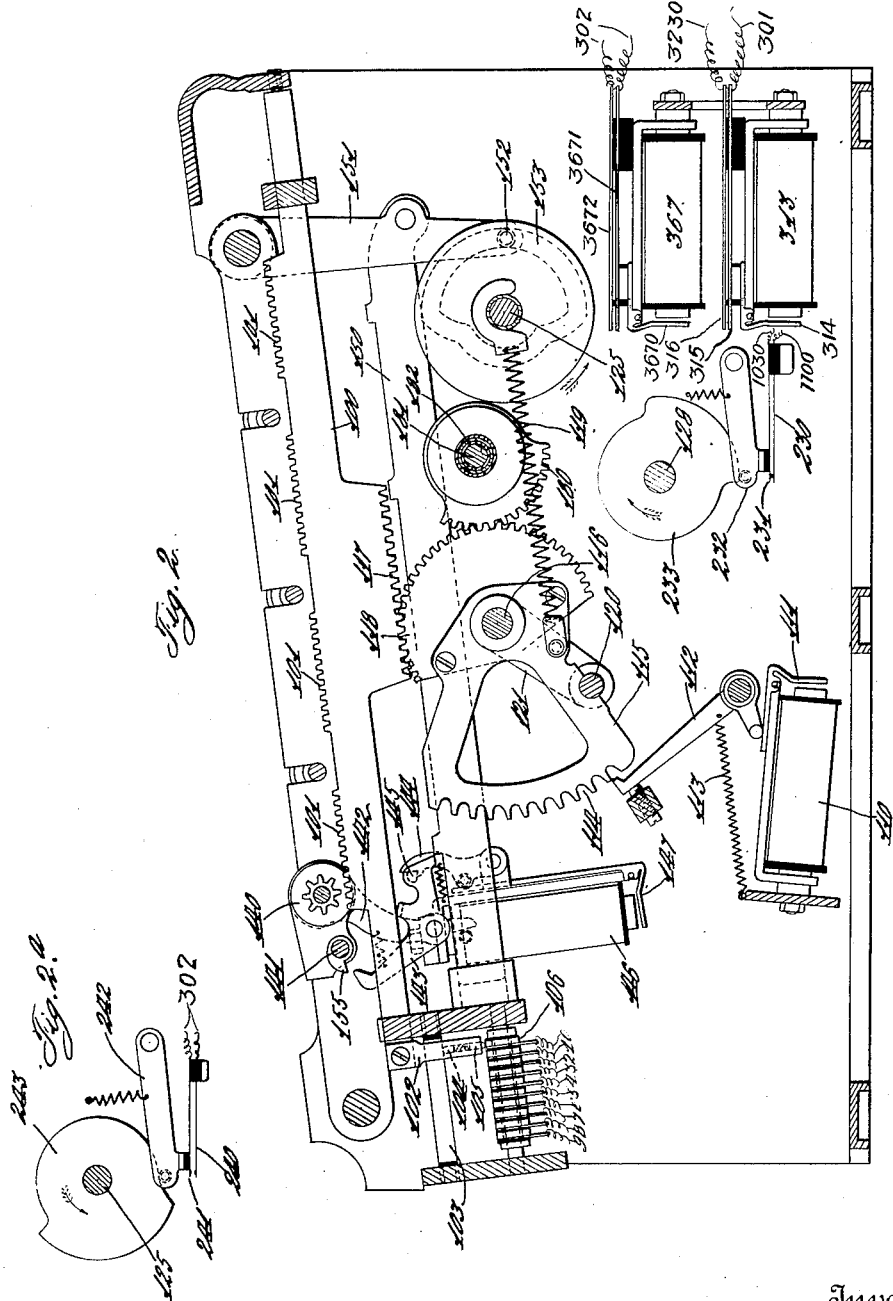

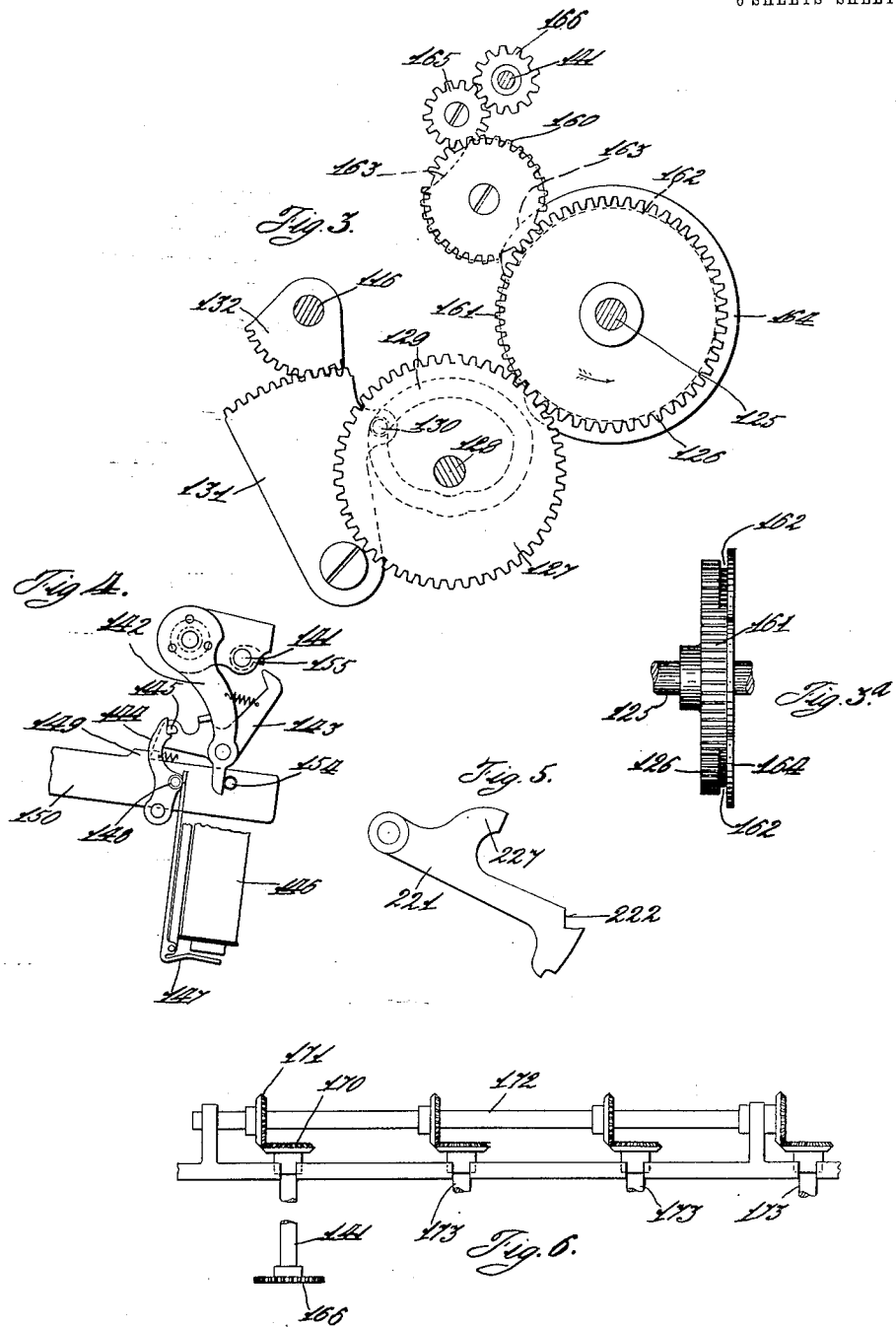

C. F. KETTERING.
CASH REGISTER.
APPLICATION FILED JUNE 8, 1906.
1,005,555.
Patented Oct. 10, 1911.
6 SHEETS—SHEET 4.
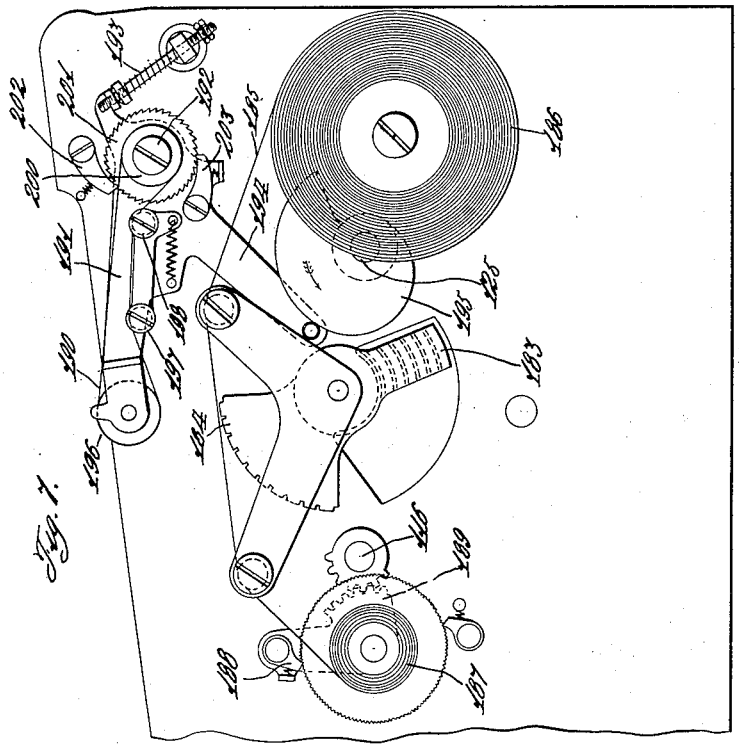
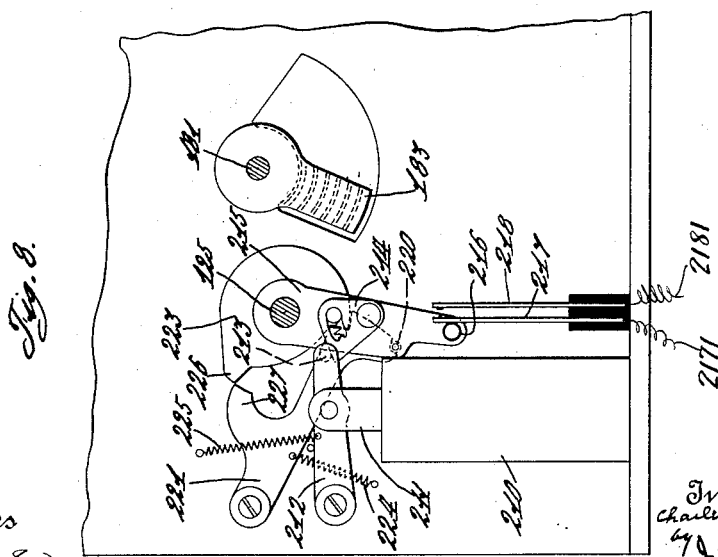
Witnesses
Inventor
Charles F. Kettering
by J. B. Hayward
and R. C. Glass
Attorneys

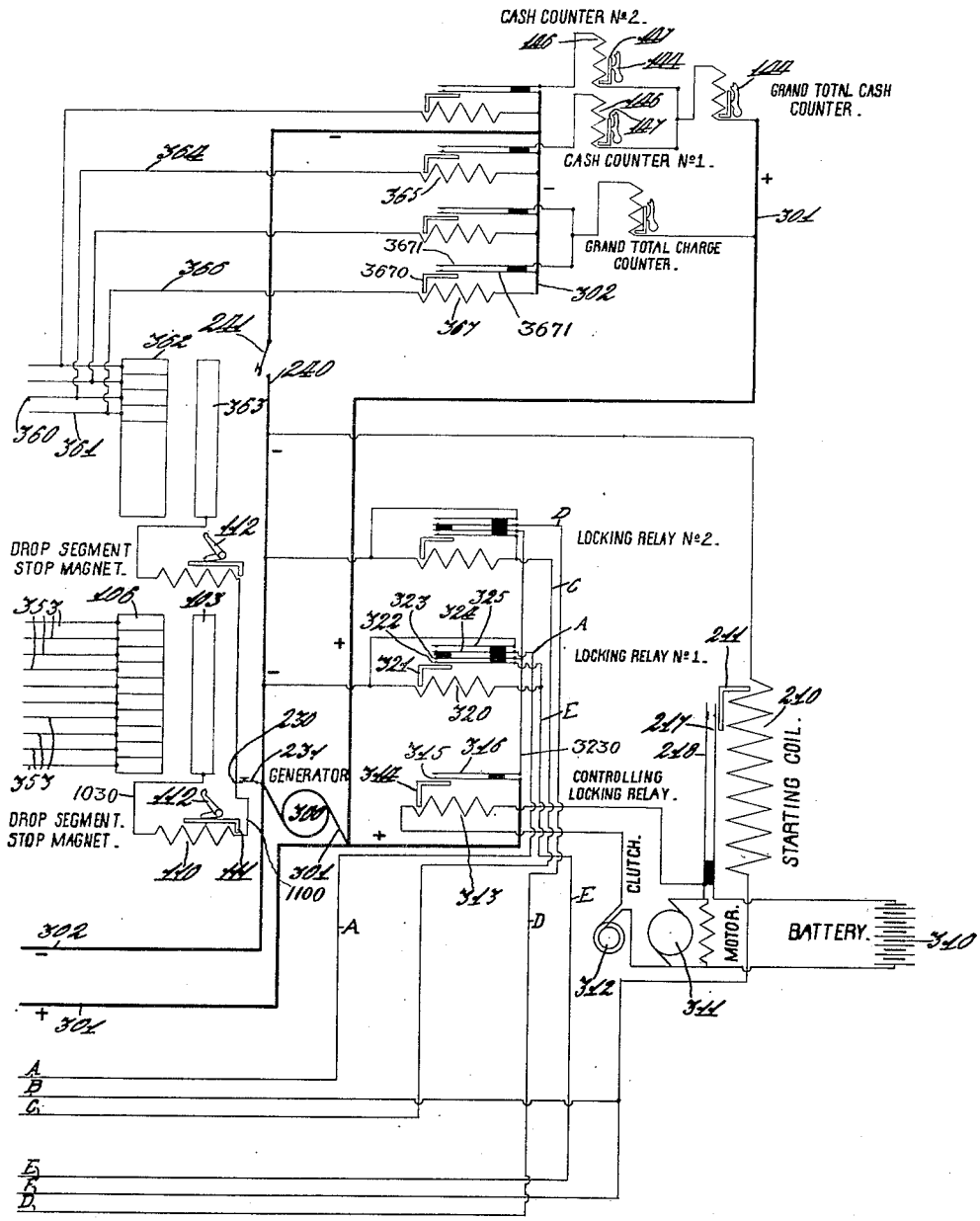

UNITED STATES PATENT OFFICE.

CHARLES F. KETTERING, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,005,555.   Specification of Letters Patent.   Patented Oct. 10, 1911.

Application filed June 8, 1906. Serial No. 320,849.

*To all whom it may concern:*

Be it known that I, CHARLES F. KETTERING, a citizen of the United States, residing at Dayton, in the county of Montgomery and State of Ohio, have invented certain new and useful Improvements in Cash-Registers, of which I declare the following to be a full, clear, and exact description.

This invention relates to improvements in registering machines in which the manipulation of one machine, which may be called the sending machine, electrically controls at a distance the operation of another machine which for convenience may be called the receiving machine.

It is among the objects of the invention to provide improved devices for controlling the electrical operation of the receiving machine by one or more sending machines and also providing suitable interlocking and indicating devices between these machines which will prevent conflict of operation at the receiving machine when a plurality of sending machines are to be operated.

With these and incidental objects in view, the invention consists in certain novel features of construction and combination of parts, the essential elements of which are set forth in appended claims and a preferred form of embodiment of which is hereinafter specifically described with reference to the drawings which accompany and form part of this specification.

Of said drawings: Figure 1 represents a vertical cross-section through the sending machine. Fig. 1ª represents a detail view of part of the special transaction setting rack and the electric contacts controlled thereby. Fig. 1ᵇ represents a detail view of a locking mechanism for the sending machine. Fig. 1ᶜ represents a detail cross-sectional view through one of the series of contact making plates. Fig. 2 represents a cross-sectional view of the receiving machine, certain parts being omitted for the sake of clearness. Fig. 2ª represents a detail view of a switch device for controlling the counter magnets. Fig. 3 represents a detail view of the operating gears for the receiving machine. Fig. 3ª represents a top view of one of the gear wheels shown in Fig. 3. Fig. 4 represents a detail view of part of the mechanism for throwing in the counters on the receiving machine. Fig. 5 represents a detail view of one of the locking pawls used in connection with the devices shown in Fig. 6. Fig. 6 represents a detail view of certain bevel gears used for operating the transfer shafts for the counters on the receiving machine. Fig. 7 represents a side elevation of the printer mechanism for the receiving machine. Fig. 8 represents a detail view of certain locking mechanisms; and contact making devices; and Figs. 9 and 10 represent diagrammatic views of the various electrical circuits and connections.

For the purpose of setting forth in a general way the construction of the devices which have been specifically adopted to carry out the broad objects mentioned above, it may be stated that the sending machine comprises a series of setting elements which when adjusted to differential positions effect the adjustment of certain contact making devices to differential positions; and when this sending machine is operated by the turning of a crank handle or other suitable means, this results in the closing of a circuit through a motor attached to the driving shaft of the receiving machine so as to operate said receiving machine. At the same time a circuit is established through a corresponding set of contact plates in the receiving machine so as to make a live contact point out of the particular one of these contact plates which corresponds to the setting position of the sending machine. This making of such a live contact at the receiving machine results in an electromagnet being energized to stop and lock a differentially movable rack at a certain point in its movement corresponding to the differential extent of movement predetermined by the sending machine. The receiving machine also carries a series of independent counters which are normally out of operative position and any one of which or combination of which may be thrown into operation as predetermined by whichever sending machine is operated. The operation of the driving mechanism of the receiving machine results in the restoration of the aforesaid displaced racks to normal position whereby to actuate whichever counter or counters have been thrown into operative position by the manipulation of the corresponding sending machine. Provisions are also made for unlocking the receiving machine from any one of the sending machines and for also locking all of the other sending machines except the one which is being operated and for visually indicating at such other machines that some other machine is in use. In addition, the setting elements of the particular sending machine which is operated are themselves automatically locked until the receiving machine has completely finished its operation, and as soon as the sending machine has been completely operated it cannot again be operated until the receiving machine has completely operated. This specific arrangement of parts will now be described in detail.

The sending machine shown in Fig. 1 is provided with a series of setting elements or levers 20 which are suitably pivoted upon a transverse shaft 21 and at their lower extremities carry rack segments 22 meshing with the teeth of the vertical rack bars 23 which at their upper ends also have another set of teeth meshing with a pinion on the side of indicator wheels 24. These levers 20 move over the ordinary form of scale on the front of the machine so as to be set differentially at any desired point according to the amount to be registered. Upon the side of each rack bar there is attached a block 25 which (as shown in Fig. 1ᶜ) is separated from the rack bar 23 by an insulating strip 26, the block being attached to the rack by screws which are also suitably insulated from the block. Suitably seated in the lower part of this block are two spring-pressed plungers 30 and 31. The plunger 30 makes a contact with a series of contact disks 32 suitably insulated from each other by thin strips 33 of insulating material. These contact disks 32 are all mounted upon a rod 34 which has a suitable insulating collar to insulate the disk from the supporting rod. The plunger 31 makes contact with a vertical rod 35 which extends parallel to the rod 34 and is insulated from the supporting bar of the machine in which it is mounted by means of insulating collars 36. In the normal zero position of any lever 20, its plunger 30 rests upon the lowest contact disk 32 (as shown in Fig. 1) which disk is the zero contact disk. When any lever is pulled downward to be set for value amounts from 1 to 9, the raising of the rack bar 23 carries the plunger 30 successively along the various contact disks 32. These disks have extending from them arms 37 which are adapted to have wires soldered to them to extend to a set of corresponding contact disks in the receiving machine as will presently be described. For convenience in designation, these arms 37 are designated by numerals from "0" to "9" to correspond with the setting position of the levers 20. The other plunger 31 continually makes contact with the rod 35 in whatever position the rack bar 23 assumes so that this rod constitutes the "common" for all of the separate contact disks 32. That is, this common rod 35 has attached to it the common lead wire from the battery or other source of electric energy, and the current then flows through the plunger 31, block 25 and plunger 30 into the particular contact disk which the plunger 30 touches, and this arrangement of contact disks and common is repeated at the receiving machine as will presently be described so as to energize the proper contact disk at the receiving machine. On the lower portion of each rack bar 23 is fastened a rack 40 having beveled teeth which engage a plunger 41 supported in a cross bar of the machine and spring-pressed to normally engage the rack 40. The forward end of this plunger engages a set screw projecting from a rock frame 42 pivoted upon a transverse shaft 43 and carrying a forwardly extending arm 44 which has a roller 45 mounted in it. This roller 45 normally stands opposite a notch 46 formed in a disk fast upon the main operating shaft 47 of the machine. This shaft is arranged to be rotated by means of any suitable crank handle or lever or motor to effect the necessary registration or printing at this sending machine after the setting levers have been set. No such registering or printing mechanism is shown herein as any one of the various well known forms may be adapted to this purpose. While any lever is being set the rack 40 acts upon the plunger to rock the frame 42 to carry the roller 45 into the notch 46 and lock the machine while any lever is occupying any improper intermediate position between successive value points. This same rock frame 42 is arranged to be locked subsequently by a pawl 48 so as to prevent any movement of the levers 20 after the receiving machine has started its operation. An electro-magnet 49 operates a bell crank armature 50 to raise the horizontal arm of said bell crank lever upon which the pawl 48 rests, and carry the pawl upward into position forward of the frame 42 so as to prevent the rocking of said frame and thus prevent any levers from being moved. This magnet 49 is controlled by the receiving machine as will be described later in connection with the electric circuits. The sending machine normally stands locked and is unlocked by the operation of the clerk's lever, this clerk's lever being exactly similar to the construction above described but having in addition to the segment rack 22, an additional rack 60 (see Fig. 1) which when the clerk's lever is operated acts upon the lug 61 on an arm 62 to raise a pin 63 on said arm out of the path of a locking pawl 64 so as to permit the spring 65 to draw the pawl rearward and retract its locking shoulder from engagement with a locking disk on the main operating shaft 47 and thus unlock the machine. A nose 66 on said locking disk strikes the foot 67 of said locking pawl when the shaft 47 has made almost one complete revolution and positively restores the locking pawl to locking position so as to lock the machine at the end of one revolution of the shaft 47 and thus compel a new movement of the clerk's lever to unlock the same. A cam disk 70 also fast upon the shaft 47 acts upon an anti-friction roller carried by a pivoted arm 71 so as to swing said arm upward when the machine is operated. This arm has an insulating block attached to its upper side, which block presses upon a contact strip 72 above which are two other contact strips 73 and 74 suitably insulated from each other and from the strip 72. When the shaft 47 is turned slightly, the disk 70 causes the arm 71 to press all three contact strips 72, 73 and 74 together. These contact strips have conducting wires attached to them to complete certain circuits as explained later in connection with the diagrammatic views, Figs. 9 and 10.

Fig. 1ᵇ shows a construction which may be used if desired, to lock the sending machine after one complete operation, by the operation of the aforesaid pawl 48. That is, the pawl may have extending upward from it an arm 80 arranged to engage a pin 81 formed on a disk 82 fast to the aforesaid shaft 47. When this shaft 47 is revolved slightly in the direction shown by the arrow, the pin 81 is moved out of the path of the locking arm 80; but as soon as the receiving machine starts to operate, the pawl 48 is as previously mentioned, thrown upward to lock the setting levers of the sending machine, and this also brings the arm 80 into the path of the pin 81 so as to lock the shaft 47 until the pawl 48 has dropped, which occurs at the completion of the operation of the distant receiving machine as will be described.

In addition to the ordinary amount setting levers 20 and the clerk's setting lever, there is also provided a special transaction lever which is attached to a special transaction rack 90 shown in Fig. 1ᵃ. On the side of this rack 90 is an insulated roller 91. Below this roller there extends a metal strip 92 to the other end of which is attached an electric wire forming part of a certain circuit to be described later. Above this strip 92 is a shorter strip 93 and below is still another strip 94. Normally the spring strip 92 is in contact with the upper strip 93 so as to complete an electric circuit through such mechanisms in the receiving machine as will cause a cash counter or counters in said machine to be operated. When however the rack 90 is lowered, the roller 91 presses upon the strip 92 and carries the same away from the strip 93 and into contact with the strip 94 thereby closing such circuit as will cause the operation of a special charge counter in the receiving machine. That is, this special transaction setting element has two positions, in one of which corresponding to the upper position of the rack bar 90, the cash counter or counters of the receiving machine will be operated; and in the other position the charge counter of the receiving machine will be operated. It will be understood that this special transaction setting element may be arranged to control other circuits so as to cause the operation of any desired counters individually at the receiving machine or any combination of such counters.

The receiving machine will now be described. This machine is shown in cross-section in Fig. 2 and has mounted in suitable transverse guide and supporting bars, a series of horizontal rack bars 100 corresponding to the rack bars 23 of the sending machine. That is, one rack bar for each of the amount levers of the setting machine and one also for the clerk's transaction lever and the special transaction lever. These rack bars are arranged to be moved mechanically to distances exactly corresponding to the differential movements of their corresponding setting levers so as to give an accounting at the receiving machine predetermined by the accounting at the sending machine. Each of the amount rack bars 100 has on its upper surface four sets of rack teeth 101 arranged to actuate corresponding independent counters. One of these counters is shown in Fig. 2, it being understood that there are four of these counters in all, the first counter being a cash counter for sending machine No. 1, the second counter being a cash counter for sending machine No. 2 (where two distant sending machines are both to have their transactions turned in to the common receiving machine); and the third counter is for a grand total cash counter; while the fourth counter is for the grand total credit or charge counter. In order to set these rack bars differentially, the forward end of each bar has attached to it a downwardly extending block 102 which slides upon a rod 103. This rod is suitably insulated from the supporting framework and is electrically connected to the aforesaid common rod 35 of the corresponding rack bar on the sending machine. The said block 102 has seated in it two spring-pressed plungers 104 and 105 which are spring-pressed apart so that the upper one engages the common rod 103 and the lower one engages one or another of a series of contact disks 106 which are arranged similar to the aforesaid contact disks 32 of the sending machine and are electrically connected one to another, that is, the zero plate of the sending machine is connected with the zero plate of the receiving machine, and so on. In circuit with the commons 103 and 35 is an electromagnet 110 which when energized acts upon the bell crank armature 111 to throw the horizontal arm thereof upward. On this arm rests a downwardly extending foot of a locking pawl 112 normally spring-drawn forward by means of a spring 113. The nose of this pawl is arranged to engage any one of a series of notches 114 formed in a drop segment 115, pivoted upon the transverse shaft 116. On the lower side of each rack 100 is a set of rack teeth 117 engaging the teeth of a segment plate 118 fast to the drop segment 115. A spring 119 is also attached to the drop segment 115 so as normally to pull the segments 115 downward and cause the same to drop to lowest position and thereby move the corresponding rack bar forward. A restoring bar 120 extends under all of the drop segments 115, said bar being hung upon arms 121 fast to the shaft 116 which shaft is a rock shaft and is rocked as will presently be described at each operation of the machine to carry the restoring bar 120 away from the segments 115 to permit the same to drop. The dropping of any segment of course, through its segmental plate 118 also causes the corresponding rack bar 100 to move forward, thereby carrying the contact plunger 105 over the series of contact disks 106. As soon as the plunger reaches a disk, the corresponding one of which at the sending machine has its plunger resting upon the same, this completes an electric circuit through these corresponding contact disks 32 and 106, through the commons 103 and 35, and also through the magnet 110. Thereupon the armature 111 throws the pawl 112 rearward to engage the notch 114 which has been brought opposite the pawl and thus the dropping movement of the segment 115 is stopped. This also results in the checking of the forward movement of the bar 100 so that said bar is given a differential extent of movement exactly corresponding to the differential movements of the setting rack bar at the sending machine. Of course there is one of these rack bars 100 for each of the amount banks and also the clerk's bank and the special transaction bank; and in this manner the various racks of the receiving machine are set to positions exactly corresponding to the positions of the setting levers of the sending machine. After the racks have thus been set, the restoring bar 120 is raised thereby restoring all of the racks to normal position, and during this time the particular counters which it is desired to operate are thrown downward into mesh with their rack teeth 101 so as to be operated upon the restoring movement of the rack bars. The method of rocking the restoring rod 120 as above described is shown in Fig. 3. The main revolution shaft 125 of the receiving machine is connected to the electric driving motor so that when the current is established through said motor, said shaft 125 will be turned to effect the operation of the receiving machine. This shaft 125 has mounted upon it a gear wheel 126 meshing with a gear wheel 127 mounted upon a shaft 128. This shaft 128 carries a disk formed with a cam groove 129 into which projects a roller 130 formed on a segment rack 131 which meshes with a rack 132, fast upon the aforesaid rock shaft 116. The shape of the cam groove 129 is such that upon the operation of the gear wheels in the direction shown by the arrows, the shaft 116 will first be rocked downward to permit the segments 115 to drop as above described, and then later be rocked back again to restore the segments. The method of rocking in the counters will now be described. As shown in Figs. 2 and 4 the counter wheels 140 are mounted in a frame pivoted upon a transverse shaft 141, which frame has downwardly extending therefrom an arm 142. Pivoted upon the lower end of this arm is a pawl 143 which is held latched in the position shown in Fig. 4, by a trip pawl 144, having a shoulder upon which a lug 145 of the pawl 143 rests. An electromagnet 146 when energized draws the horizontal arm of its bell crank armature 147 upward thereby throwing the vertical arm rearward. This arm bears against a roller 148 on the side of the latch pawl 144 and thus permits the pawl 143 to spring downward to carry its foot into the path of a lug 149 projecting upward from a horizontal counter rocking bar 150. As shown in Fig. 2 this bar is reciprocated at each operation of the machine by means of an arm 151, the lower end of which arm carries the roller 152 playing in a cam groove 153 formed in a disk fast upon the revolution shaft 125 so that as said shaft revolves the bar 150 is thrown forward after the registering racks have been set, and then subsequently retracted rearward after the racks have been restored to normal position, the racks being restored while the counters are in mesh with their respective racks. The movement of the bar 150 throws in whichever counter has had its pawl 143 tripped by the operation of its corresponding electromagnet as just above described; that is, the lug 149 strikes the foot of the displaced pawl 143 and by forcing forward the arm 142, rocks the counter 140 downward to carry its pinion into mesh with the rack teeth 101. When the bar 150 is restored to normal rearward position, the pin 154 thereon strikes the lower end of the rocker arm 142 and positively throws the counter upward again out of mesh with the rack teeth. In order to recock the trip pawl 143, the aforesaid shaft 141 is given a complete revolution at each operation of the machine, and this shaft carries a cam 155 which strikes a nose at the upper end of the pawl 143 so as to recock the pawl and permit the same to be latched in normal position shown in Figs. 2 and 4. This shaft 141 constitutes in this particular case a transfer shaft to effect the transfers in the counter wheels when the transfer pawls of the counters have been tripped, it being understood that any ordinary form of counter mechanism with transfer devices therefor may be used, the transfer taking place after the registration by the racks. The aforesaid gear wheel 126 (see Fig. 3) meshes with a gear 160. It is desired to revolve the gear 160 during only one portion of the revolution of the gear wheel 126, and for this purpose the gear wheel 126 is made in the form shown in Fig. 3ª being widened over a certain extent of its periphery as at 161, and being cut away as at 162. The gear wheel 160 is in alinement with the cutaway portion 162 and the widened portion 161, while the aforesaid gear wheel 127 is in alinement with the left-hand portion of the gear wheel 126 so as continually to be in mesh therewith, whereas the gear wheel 160 is turned only when the widened teeth 161 comes into contact with the same. The gear wheel 160 is formed with two locking surfaces 163 which coöperate with a locking disk 164 formed on the side of the gear wheel 126. This locking disk 164 is cut away where the teeth 161 are widened to permit the turning of the wheel 160, and at other times locks the wheel 160 from movement. With one revolution of the gear 126, the gear 160 is given a half revolution, and this through a pinion 165 transmits a complete revolution to a gear wheel 166 fast on one end of the aforesaid transfer shaft 141. It will be understood that there is one of these counters for each of the four sets of racks 101, and in order to transmit one complete revolution to the transfer shaft for each counter, the beveled gear arrangement is provided (shown in Fig. 6). On the end of the shaft 141 above described, is a beveled gear 170 meshing with a beveled gear 171 fast on the shaft 172, and by means of similar beveled gears one complete revolution is transmitted to the other transfer shafts 173. As above stated, this particular receiving machine is arranged to have four counters, the first one being the cash counter for sending machine No. 1, the second one being the cash counter for sending machine No. 2, the third the grand total cash counter for both sending machines, and fourth the grand total charge counter for both sending machines. Whenever any one of the magnets 146 is energized as above described, this causes the corresponding counter to be rocked into mesh with its rack to be operated to an amount corresponding to the values set up on the sending machine. The exact arrangement of the circuits for energizing these magnets 146 will be described presently in connection with the diagrammatic views of the circuits but it may be stated here that when sending machine No. 1 is operated for a cash sale, the magnet 146 for cash counter No. 1 and also for the grand total counter are energized so as to throw both counters into operation. When sending machine No. 2 is operated for a cash transaction, the magnet of cash counter No. 2 and also the same grand total counter are energized to throw these two counters into operation; and when a charge transaction is made on either sending machine No. 1 or No. 2, the magnet for this grand total charge counter is energized so as to throw that counter alone into operation. The printing mechanism for this receiving machine will now be described.

Each of the aforesaid segment racks 118 (see Fig. 2) meshes with a corresponding rack 180 attached either to a transverse shaft 181 or to nested sleeves 182 which, by means of nested yokes 183 (see Figs. 7 and 8) are connected to type segments 184. Of course there are as many counter operating racks 100 carrying teeth 101 as it is desired to have banks of amount values, and there is also a corresponding rack for the clerk's bank without any counter operating rack teeth 101, and also a special transaction rack without any counter operating rack teeth, and these amount, clerk and special transaction racks all are connected to corresponding type segments 184 so as to print a complete record of each transaction. The detail strip paper 185 is fed from a storage roller 186, and over suitable guide rollers to a winding roller 187. The paper is fed forward the necessary step at each operation of the machine by means of the pawl 188 mounted upon an arm having a segment 189 meshing with the corresponding segment on the aforesaid rock shaft 116. An impression is taken upon the paper by means of striking an ink ribbon against the same so that the impact of the ribbon against the paper and its underlying type carriers, will cause an impression to be left upon the upper surface of the paper. This ink ribbon 190 is carried upon a rocking frame 191 pivoted at 192 and spring-pressed downward by a spring 193. An arm 194 extending downward from the rock frame carries a roller acted on by a cam 195 carried by the aforesaid shaft 125. Upon the revolution of the shaft 125, when the cutaway portion of the cam 195 is reached, the frame 191 is rocked downward under its spring tension and the forward platen roller 196 over which the ink ribbon is led, strikes the paper and leaves an impression thereon from the particular underlying type which have been set up upon the setting movements of the various rack bars to which the type segments are connected. A tension roller 197 suitably pivoted at 198 to the frame 191 is spring drawn against the under side of the ink ribbon to keep a proper tension thereon. The rearward roller 200 over which the ink ribbon is led constitutes an ink supply roller, and on the side of the same is a feed ratchet 201 engaged by a feed pawl 202 pivoted to the side frame of the machine so as to feed the ink ribbon when the ink ribbon frame rocks back again to normal position. The backward rotation of the ratchet wheel 201 is prevented by means of a retaining pawl 203.

The method of unlocking and starting the receiving machine from any one of the sending machines will now be described.

Situated in proximity to the aforesaid main driving shaft 125 is an electromagnet 210 (see Fig. 8) the armature 211 of which is attached to an arm 212 pivoted to the side frame of the machine. On the outer end of this arm is a pin 213 arranged to strike a wiper pawl 214 pivoted upon the side of an arm 215 hanging loosely upon the shaft 125 and at its lower end carrying an insulated roller 216 bearing against a contact spring 217 adjacent to which is another contact strip 218. The arm 215 also carries a pin 220 normally engaging a notch formed in the lower end of a locking arm 221, the shape of which is shown in detail in Fig. 5. This locking arm is formed with a locking notch 222 engaging a corresponding projection formed on a locking disk 223 fast upon the revolution shaft 125. A spring 224 normally draws the locking arm 221 downward, and a spring 225 normally draws the armature 211 upward. When the magnet 210 is energized and its armature drawn downward, the pin 213 acts against the pawl 214 to swing the arm 215 to cause the roller 216 to force together the two contact strips 217 and 218. This effects the closing of the circuit through wires 2171 and 2181 and the electric motor to start the receiving machine in the manner to be presently described. This swinging of the arm 215 also withdraws the pin 220 from engagement with the locking arm 221 and permits its spring 224 to pull the arm downward so as to withdraw the shoulder 222 from engagement with the locking disk 223 and thus the receiving machine is unlocked preparatory to its operation by an electric motor, which motor is suitably connected to the driving shaft 125 by means of a magnetic clutch. Of course as soon as the locking arm 221 has dropped, the outer end thereof engages the pin 220 and holds the arm 215 continually displaced to the right, thereby continuously maintaining the contact pieces 217 and 218 together, until the revolution shaft 125 has almost completed its revolution whereupon a nose 226 on the aforesaid disk 223 strikes the projection 227 on the locking arm 221 and positively restores the locking arm to normal upper position and thus permits the breaking of the contact at the terminals 217 and 218. This results in the driving motor circuit being held closed until the motor has practically completed its work, and the closing of this circuit also effects the control of certain other circuits as will presently be described. The arm 215 being thus mechanically held to the right to close the motor circuit as above described, the magnet 210 may now at any time be deënergized so as to permit its armature 211 to return to normal upper position which of course usually occurs before the arm 215 swings back to normal position which it does either by reason of suitable spring tension applied thereto or by reason of the spring tension of the contact strip 217.

It has been seen above that the series of contact disks 106 (see Fig. 2) serve to make live contact points to determine the stopping positions of the registering racks. When these racks are subsequently restored to normal position, if this contact point were still a live contact, the breaking of the current therethrough would cause sparking to take place upon these contact disks which would injure the same after continuous use. Therefore a separate switch is provided for the commons of the receiving machine, that is, a switch to make and break the circuits through the common rods 103 and the contact disks 106, independently of the breaking of the circuit at said disks. This switch comprises a contact strip 230 (see Fig. 2) over which lies a second contact strip 231. This switch is closed by means of an arm 232 pivoted at one end to the framework of the machine and at its outer end carrying a roller acted upon by a cam disk 233 fast upon the revolution shaft 128. The exact position of this switch in the circuits will be explained more definitely presently with reference to the diagrammatic views, but it may be stated now that the switch stands normally closed as shown in Fig. 2 and upon the operation of the machine, after the drop segments 115 have dropped, the cam 233 then reaches such position that the switch arm 232 is free to spring upward thus separating the contact strips 230 and 231 and thereby breaking the circuit through the commons of the receiving machine and their respective contact disks, so that whatever sparking takes places occurs at this switch, the switch opening just prior to the restoration of the racks to normal position. It has also been seen that the counters are tripped electrically to be thrown into operation, this tripping being controlled by the magnets 146 as above described (see Fig. 2). If the magnet 146 is maintained energized too long, this will hold the latch pawl 144 displaced even after the transfer shaft 141 has been rotated far enough to effect the recocking of the trip pawl 143. To avoid this difficulty, and to deënergize the counter magnets 146 in time to permit the tripping pawls 143 to be properly restored to latching position, a switch is provided for these counter magnet circuits, which switch may for convenience be referred to as the counter switch and whose position will be explained more definitely in connection with the explanation of the various circuits. The mechanical construction of this switch is shown in Fig. 2ª, comprising an under contact strip 240 and an upper contact strip 241. Above these there rests a switch operating arm 242 pivoted at one end to the framework of the machine and at its outer end carrying an anti-friction roller engaged by a cam 243 fast upon the aforesaid revolution shaft 125. This switch normally stands open, the normal position of the cam 243 being such as to permit the arm 242 to remain in its uppermost position under spring tension, thus permitting the separation of the contact strips 240 and 241. Upon the operation of the machine however, the cam 243 will act upon the arm 242 to close the circuit between the strips 240 and 241 and during the time that it is closed in this manner, the proper counter magnets 146 are energized to effect the tripping of the corresponding pawls 143 and thus effect the throwing in of the proper counter or counters. As soon as such tripping has been effected the switch may now of course be open, so that the disk 243 is cut away to permit the arm 242 to return to normal position and thus cause the separation of the contact strips 240 and 241, which strips then remain separated until the next succeeding operation of the machine.

Having now described the main mechanical features comprising the sending and receiving machines, the various arrangements of electric circuits and relay devices for controlling the manipulation of the machine will now be described with special reference to the diagrammatic views Figs. 9 and 10. These two views in reality constitute together one entire view of the various circuits and contrivances, but have been separated in this manner to permit enlargement of the views. Fig. 9 represents sending machine No. 1 and sending machine No. 2 with the electrical connections therewith, and Fig. 10 represents the common receiving machine and electrical connections, and the various lead wires extending to the right in Fig. 9 representing respectively the same lead wires which extend to the left in Fig. 10, said lead wires being properly connected each to each. The combining of Figs 9 and 10 in this manner will give the proper arrangements of the circuits.

The main source of electric energy for supplying current to the various circuits extending between the two sets of the machines is supplied from a battery or generator 300 (see Fig. 10), and the lead wires extending from this generator are indicated in heavy lines in both Figs. 9 and 10, the positive wire or main 301 being indicated at various points by the plus sign and the negative wire or main 302 being indicated by the minus sign. In Fig. 9, the two sending machines are both represented diagrammatically, being separated by the dot and dash line 303, the lower machine being sending machine No. 1 and the upper machine sending machine No. 2. Assuming that machine No. 1 is to be operated, its setting levers are first adjusted to the desired values. This adjusts the sliding contact so as to bridge across a connection between the common 35 and one of the contact disks 32. Fig. 9 shows one set of disks and a common for only one bank, the others being a repetition of this arrangement. After the setting of the levers, the crank handle of the sending machine No. 1 is turned to operate the machine. This as above described in connection with Fig. 1, effects the closing together of the three contact strips 72, 73 and 74. Strip 74 (as shown in Fig. 9) is connected to the positive main 301. The terminal 73 is connected to the wire E and the terminal 72 to a wire F. The bringing together of the strips 72, 73 and 74 therefore results in connecting the same to the positive main. Following up first the wire F, it will be seen that this wire in Fig. 10 leads to the starting coil of the magnet 210 of the receiving machine and thence to the negative main 302. The energizing of this magnet 210 as above explained in connection with Fig. 8, results in the closing of the contact between the strips 217 and 218, and these strips are then mechanically held together by the locking arm 221 until the motor of the receiving machine has almost completed its revolution. The closing of the contact between strips 217 and 218 closes the circuit from the battery 310 through the driving motor 311 which is attached to the driving shaft 125 of the receiving machine by means of the magnetic clutch 312, the circuit through which clutch is also closed by the closing of the contact strips 217 and 218. In the same circuit with this clutch is a controlling locking relay 313. When the coils of this relay are energized by the current flowing therethrough, the bell crank armature 314 is operated to force together the contact strips 315 and 316. This establishes a connection between the positive main 301 and certain locking relays for the purpose of maintaining a closed circuit through certain locking devices in the sending machines independently of the breaking of the main contact at the sending machines, as will presently be described. Following out now the wire E which was also connected to the positive main by the closing of the three-point starting switch of machine No. 1, it will be seen that in Fig. 10 this wire E extends to a locking relay No. 1, and through its magnetic coil 320 to the negative main 302. The movement of the armature 321 forces together two pairs of contact strips 322 323 324 and 325, strips 323 and 324 being separated by insulation. 322 is connected to said wire E and 323 is connected by wire 3230 to the aforesaid strip 316 of the controlling locking relay so that it is thereby connected through the strip 315 with the positive main 301. Since the strips 315 and 316 of the controlling locking relay are held together by the operation of the coil 313, which coil is energized as soon as the receiving machine motor starts and remains energized until the receiving machine has completed its operation, the result is that this controlling locking relay serves to establish the circuit through the coil 320 of the locking relay No. 1 independently of the breaking of the circuit by the completion of the operation of sending machine No. 1 and the consequent separation of the strips 72, 73 and 74. That is, the current now flows from the positive main 301 through the strips 315 and 316, wire 3230, through the strip 323, then to strip 322 and then through the relay coil 320 back to the negative main, thus maintaining the coil 320 energized and the armature 321 in position to hold together the four overlying strips. The joining of strips 324 and 325 in this manner results in the establishment of the circuit through the commons, the sliding contact, and the series of contact disks of sending machine No. 1. Strip 325 is connected to the negative main 302, while strip 324 is connected through the wire A to a locking coil 330 of sending machine No. 2. This locking coil is wound on the same core with another locking coil 331 so that either coil when energized will operate an armature 332 which throws upward the pawl 333. This closes a contact between two terminals 334 and 335 for the purpose presently shown. After going through the locking coil 330, the current extends through a lead wire 336 to an eight-point relay coil 337, then by wire 3381 to a locking coil 338 and back by wire 3382 to the positive main 301, thus completing the circuit. This locking coil 338 is on the same core with another locking coil 339 which is connected to a wire D so that when either coil is energized it will operate the armature 50, which armature as already described with reference to Fig. 1 is situated below the pawl 48, and when operated raises said pawl to lock the rock frame 42 of sending machine No. 1 so that the setting levers of this machine cannot now be moved so long as this locking relay coil is energized. If the device shown in Fig. 1ᵇ is also used, this also results in the locking of the operating shaft of machine No. 1 at the end of one complete revolution, so that said machine cannot again be operated until the locking coil 338 is deenergized which occurs after the receiving machine has completed its operation. The lifting of the pawl 48 also closes together two contact strips 340 and 341. 340 is connected to the positive main and 341 is connected through an indicator light 342 to the negative main, this indicator light being suitably mounted anywhere on the sending machine so that when it is lighted in this manner it will indicate to the operator that the machine is locked by reason of the receiving machine not having completed its operation. The above described armature 332 and pawl 333 for machine No. 2 are exactly similar to the armature 50 and pawl 48 for machine No. 1 and the locking connections are the same for machine No. 2 as for machine No. 1 so that when this locking coil 330 is energized as above explained, this results in the locking of all of the levers of machine No. 2 and also in the locking of the operating shaft of machine No. 2 so that neither the levers nor said shaft may be operated until the receiving machine has completed its operation. The aforesaid strips 334 and 335 also close the circuit through a lamp 343 similarly arranged to the lamp 342 so that when lighted this lamp will indicate that another machine is in use, namely: machine No. 1 and that the receiving machine has not completed its operation.

The above described energizing of the eight-point relay coil 337 causes the operation of its armature 350 which thereupon forces together the eight contact strips 351. The lowermost of these strips is connected to the positive main 301, and the uppermost strip is connected by wire 352 to the strip 92 of the special transaction switch shown in Fig. 1ᵃ; while the other intervening strips 351 are connected by wires 3510 to the other commons of the other amount banks and the clerk's bank, only one common of each sending machine being shown herein. In this manner, the commons of all the banks of sending machine No. 1 including the common of the special transaction element are connected to the positive main. The bridging across of the sliding contact between the common 35 and the contact piece 32 closes the circuit through some one of the wires 353, which wires extend to their corresponding contact disk 106 of the receiving machine. When the receiving machine racks are operated and reach the contact disk 106 corresponding to the live contact disk 32, this bridges across the circuit between this disk 106 and the common 103 and thereby completes the circuit by wire 1030 through the stop magnet coil 110, wire 1100 back to the negative main through the switch terminals 230 and 231, and this operates the locking pawl 112 to stop and lock the rack as above explained. These switch terminals 230 and 231 constitute the switch for the commons hitherto explained with reference to Fig. 2, said switch normally standing closed so as to make the circuit through the commons and the series of contact disks, but being opened before the racks of the receiving machine are restored to normal position, so that no sparking will take place upon the series of contact disks 106. The switch contacts 230 and 231 are then closed at the end of the operation of the receiving machine as previously described.

The control of the counters at the receiving machine by the special transaction element of the sending machine will now be described.

The common strip 92 of the special transaction contact device is, as above stated, connected to the wire 352. The upper contact strip 93 is connected to wire 360, and the lower strip 94 to wire 361. These wires as shown in Fig. 10 are connected respectively to the third and fourth contact disks 362 of a series of four special transaction contact disks in the receiving machine. 363 is the common for this set of four disks and is connected through a coil of a stop magnet for the drop segment of the special transaction rack of this machine. In the normal position of the special transaction lever for sending machine No. 1, the contact strip 92 rests against strip 93 thereby establishing the circuit through the wire 360 to the third contact disk 362 so that the special transaction rack will be moved three units to set up the special transaction printing wheel to print "Cash No. 1" or suitable abbreviation therefor. It will be seen that the same switch 230 and 231 which cuts off the current from the commons 103 also serves to cut off the current from the common 363 for the special transaction bank so as in a similar manner to prevent sparking at the special transaction contact disks.

The wire 360 is connected by a wire 364 through a coil 365 to the negative main 302 so as to energize the coil 365 and thereby close together two contact strips lying above the armature of the coil so as to close another circuit leading from the negative main through the magnet coil 146 of cash counter No. 1 and also through a similar magnetic coil for the grand total cash counter and then to the positive main 301. It will be remembered that the energizing of any coil 146 causes the tripping of the latch pawl 144 to throw in the corresponding counter. Therefore the flowing of the current through the wire 364 causes the throwing in of cash counter No. 1 and the grand total cash counter in the receiving machine. Similarly wire 361 is connected to wire 366 which goes through the coil 367 and then to the negative main and thereby operates the armature 3670 of this coil to close together the two overlying contact strips 3671 and 3672 and thus establish a circuit extending from the negative main 302 through the grand total credit or charge counter magnet coil and back to the positive main so as to cause said grand total credit counter to be operated. This throwing in of the grand total credit counter thus occurs when the special transaction lever of sending machine No. 1 is moved to carry the roller 91 against the common strip 92 to force the latter strip against the lower strip 94. When the special transaction setting lever is in such position, and the current flows through the wire 361, of course this will make a live contact out of the fourth contact disk 362 of the special transaction series of contact disks in the receiving machine, and this will cause the special transaction rack to be moved four degrees to print "Charge No. 1" or suitable abbreviation thereof.

Without any further explanation it will be readily understood from the diagrams that for sending machine No. 2, the amount banks have their various contact disks connected to the proper and corresponding wires 353 so as to control the setting of the same racks in the receiving machine as are controlled by the sending machine No. 1. Likewise the sending machine No. 2 has a special transaction contact device similar to the strips 92, 93, and 94 already described for machine No. 1. These strips are connected to the first and second special transaction contact disks 362 so as to cause the setting of the special transaction rack to print either "Cash No. 2" or "Charge No. 2," and similarly the special transaction element of this sending machine No. 2 when set to cash position, causes "cash" counter No. 2 and the grand total cash counter to be thrown into operation, while when set to "charge" position, only the grand total "charge" counter will be operated. This will readily be seen from the reading of the diagrams.

The function of the counter switch which has already been described with reference to Fig. 2ª will now be clearly seen in that when said switch terminals 240 and 241 are connected which occurs as soon as the receiving machine has started, this makes it possible to establish the circuit between the negative main and through the various counter controlling coils to the positive main; and when the switch is broken none of these counter coils can be energized so that the latch pawls 144 are free to return to normal position and permit the recocking of the tripping pawls 143 so that the same counters will not again be thrown into operation unless the same machine is again operated in the same manner. As soon as sending machine No. 1 has completed its operation, of course the contact strips 72, 73 and 74 are separated, but such separation no longer has any effect upon the operation of the receiving machine or upon the locking devices for the sending machines Nos. 1 and 2, because the starting of the current through the receiving machine motor 311 has also operated the controlling locking relay having the coil 313 as above described. This controlling locking relay therefore establishes the various circuits between the two sending machines and the receiving machine independently of the establishment of the circuit at the contact strips 72, 73 and 74. The circuit for setting the rack bars differentially is automatically broken by the switch contacts 230 and 231 before the sending machine completes its operation, and the circuit for the control of the counters of the receiving machine is also automatically broken by the operation of the switch 240 and 241 before the receiving machine completes its operation, all as above described. But the controlling locking-relay still maintains the circuit through the locking coils 330 and 338 for both machines Nos. 1 and 2 so that said machines have both their setting levers and their operating shafts permanently locked until the receiving machine has fully completed its operation, whereupon the armature 211 is automatically restored to normal position and the contact strips 217 and 218 separated so as to break the current both through the driving motor and through the controlling locking relay and thus unlock both sending machines.

It will be understood from a consideration of the diagrams that when sending machine No. 2 is operated, the operation of the various circuits and devices will be similar to that already described for machine No. 1, the proper amount being registered and recorded at the receiving machine, and the automatic closing of the circuit through the aforesaid controlling locking relay coil 313 this time operates the locking devices for the sending machines by means of the locking relay No. 2 shown in Fig. 10. Wires B and C for machine No. 2 correspond to wires E and F for machine No. 1, wire B acting to start the driving motor 311 and wire C leading to locking relay No. 2. Wire D for machine No. 2 corresponds to wire A for machine No. 1, wire D leading from locking relay No. 2 through the locking coils 339 of machine No. 1 and through locking coils 331 of machine No. 2 and then through the eight-point relay coil for machine No. 2 back to the positive main. It is to be understood that this arrangement of locking devices and circuits may readily be extended to any number of sending machines all turning in their accountings to one and the same receiving machine, with the results above indicated in connection with the use of these two sending machines.

The above described system is well adapted for department stores, in which use there would be placed in each department of the store one of the sending machines, and at the central or receiving station would be located a receiving machine having registering devices, such as totalizers, corresponding in number to the departments, a grand totalizer upon which is accumulated the total of all of the departmental totalizers, and also a credit totalizer upon which is entered the credit transactions occurring in all the departments of the store.

While the form of mechanism herein shown and described is admirably adapted to fulfil the objects primarily stated, it is to be understood that it is not intended to confine the invention to the one form of embodiment herein shown and described but that it is susceptible of embodiment in various forms all coming within the scope of the claims which follow.

What is claimed is as follows:—

1. In a machine of the class described, the combination with a plurality of independent controlling mechanisms each including a differentially movable element, of a distant controlled enumerating means also including a differentially movable element, circuit connections from all said controlling mechanisms to said controlled means for each position of said movable elements, and devices in said controlled means for moving the differential element thereof to extents determined by the circuit connection which is employed.

2. In an accounting mechanism the combination with a plurality of differentially adjustable independent controlling means, of a distant enumerating means, and operating means and connections between the controlling and enumerating means adapted to cause each operation of the latter in correspondence with an operation of any of the former.

3. In an accounting mechanism, the combination with a plurality of controlling means, each comprising a plurality of differentially movable devices, of a distant registering device having a plurality of differentially movable elements, and connections between the differentially movable devices of all of the controlling means and the differential elements of the registering device for causing a movement of the elements of the latter device proportionately to the movement of the differential devices of any of the controlling means.

4. In an accounting mechanism the combination with a plurality of independent controlling devices, of a receiving device for all of said controlling devices, connections between said controlling and receiving devices for operating the latter through an operation of the former, and means at all the controlling devices for indicating that the receiving device is being operated.

5. In an accounting mechanism, the combination with a controlling device having a plurality of differential adjustable elements, of a distant controlled device having a plurality of differentially movable enumerating members, means for controlling the enumerating members of the controlled device by the adjustable elements of the controlling device, and means for indicating at the controlling device that the controlled device is operating.

6. In an accounting mechanism, the combination with a controlling device having a plurality of differentially adjustable elements, of a distant controlled device having a plurality of differentially movable enumerating members, means for controlling the enumerating members of the controlled device by the adjustable elements of the controlling device, and means at the controlling device for indicating when the controlled device ceases operating.

7. In a cash register, the combination with a sending machine having a plurality of differentially adjustable setting elements, a contact piece movable in correspondence with each setting element, and a series of contacts for each movable contact, of a receiving machine comprising a series of differentially movable controlling elements having rack teeth, a contact movable with each element, a series of contacts for each movable contact, a counter movable into and out of mesh with said rack teeth, circuits including the respective series of contact devices and having a common return, and a magnet in said common return part of the circuit.

8. In a cash register, the combination with a plurality of counters, of operating devices common to the same and means for producing a differential motion of the operating devices comprising a contact movable with said devices, a plurality of stationary contacts with which the movable contact is adapted to engage, circuits for said contacts, a magnet in said circuits, means controlled by said magnet for locking the operating devices in set position, and means for engaging any counter with the operating devices.

9. In a cash register, the combination with an operating mechanism, of a counter and means for throwing said counter into and out of operative position; comprising a holding pawl, a magnet operating said holding pawl, a movable bar, and a pawl connected to said counter and normally held by said holding pawl, but adapted when released to be operated by said bar.

10. In an electrical cash register, the combination with a sending instrument having movable setting elements and an operating mechanism of a receiving instrument having movable parts, and means for preventing movement of the setting elements while the receiving instrument is operating said means including a circuit and a magnet in said circuit, and means for maintaining said circuit through said magnet until said receiving instrument completes its operation.

11. In a cash register, the combination with a plurality of counters each having a plurality of movable elements, of operating devices common thereto, and means for selecting a counter for operation, comprising a circuit, a relay therein, a local circuit controlled by the relay and a magnet in said local circuit.

12. In a cash register, the combination with a plurality of differentially adjustable operating elements, of accounting devices operated by the same, a frame in which said devices are mounted, and means for rocking the frame comprising a bar carried by the frame, a pawl on said bar and having a lug, a slidable part having a projection and means moving the pawl into and out of contact with said projection.

13. In a cash register, the combination with a differentially movable element and a counter operated thereby, of a normally locked electric motor for moving said element, a circuit for said motor including contacts, a controlling magnet and means operated thereby for unlocking said motor and closing said contacts.

14. In a cash register the combination with a differentially movable element and a counter operated thereby, of a normally locked electric motor for moving said element, a circuit for said motor including contacts, a controlling magnet, means operated by said magnet for closing and locking said contacts, and means operated by the motor for positively returning said locking device to normal position and unlocking said contacts.

15. In a cash register, the combination with a sending instrument having a differentially movable element and means for locking same in any position to which it has been moved of a receiving instrument having an operating mechanism, means at the sending instrument for controlling the operation of the receiving instrument and means at the receiving instrument controlled by the operating mechanism thereof for enabling and disabling the said locking means.

16. In a machine of the class described, the combination with a receiving instrument having accounting devices, of a plurality of controlling mechanisms for transmitting to said receiving instrument transactions to be accounted, means in the controlling mechanism for varying, as desired the details of the transactions transmitted to the receiving instrument, operating connections between all the controlling mechanisms and the receiving instrument, with provisions whereby adjustment of the remaining controlling mechanisms is prevented during transmission from any one of the controlling mechanisms.

17. In a cash register, the combination with a receiving instrument having accounting devices of a plurality of controlling mechanisms for said instrument, means whereby an operation of any controlling mechanism will be accompanied by a corresponding operation of the accounting devices and means controlled by the receiving instrument preventing an operation of the other controlling mechanism while the receiving instrument is being operated from one controlling mechanism.

18. In a cash register, the combination with a sending instrument having a differentially movable manipulative element and means for locking said element, of a receiving instrument having differential elements for preserving an entry of each transaction, means for operating the receiving instrument controlled from the sending instrument and means controlled by the receiving instrument for locking said manipulative element during the complete operation of the receiving instrument.

19. In a cash register, the combination with a receiving instrument having a plurality of accounting devices and means for operating same, of a plurality of sending instruments having manipulative devices, connections for operating the receiving instrument in accordance with an operation of any sending device means at each sending device controlled from the receiving device for preventing operation of the manipulative elements of each sending device during the operation of the receiving device and means at each sending device, to indicate that the receiving device is being operated.

20. In an accounting mechanism, the combination with a plurality of controlling means each having a plurality of differentially adjustable devices, of a controlled mechanism having a plurality of differentially movable elements, and connections between the differentially adjustable devices of all of the controlling means and the movable elements of the controlled mechanism for causing an operation of the adjustable devices of any of the controlling means to be accompanied by a commensurate operation of the differentially movable elements of the controlled mechanism.

21. In a printing mechanism, the combination with type carriers, of means for taking impressions therefrom; said means comprising a pivoted frame, rollers including platen and feeding rolls carried by said frame, an inking ribbon surrounding said platen and feeding rollers, and means for rocking said frame to move said platen roller to take impressions from said type carriers and for feeding said ribbon.

22. In a system of the character described, the combination with a central receiving machine having differentially movable elements, of a plurality of distant sending machines each having differentially adjustable devices, and electrical connections between the adjustable devices of all of the sending machines and the differentially movable elements of the receiving machine for causing movement of the movable elements of the receiving machine proportionately to the movement of the adjustable devices of any of the sending machines.

23. In a system of the character described, the combination with a central receiving machine, including differentially movable elements, of a plurality of distant sending machines each having differentially movable elements, electrical connections between the receiving machine and the respective sending machines, and means for locking the other sending machines while any one sending machine is operating the receiving machine.

24. In a system of the character described, the combination with a central receiving machine including differentially movable elements, of a plurality of distant sending machines each having differentially movable elements, electrical connections between the receiving machine and the respective sending machines, means for causing a corresponding movement of the differentially movable elements of the receiving machine when any one sending machine is operated, and means for locking the sending machine at the end of its operation until the receiving machine finishes its operation.

25. In a system of the character described, the combination with a central receiving machine having differentially movable elements, of a plurality of sending machines at a distance and each having differentially movable elements, electrical connections between the receiving machine and the respective sending machines, means for causing a corresponding movement of the differentially movable elements of the receiving machine when any one of the sending machines is operated, and means for indicating at each operation and at each machine that the receiving machine is being operated.

26. In a system of the class described, the combination with a plurality of sending machines each having differentially movable controlling elements, of a distant receiving machine having a plurality of controlled enumerating elements, connections between the several sending machines and the receiving machine for controlling the latter by the former, and means at each sending machine but controlled by the receiving machine for locking all said controlling elements while the receiving machine is operating.

27. In a system of the class described, the combination with a plurality of sending machines each having controlling elements, of a receiving machine having differentially movable enumerating elements, connections between all the elements of all the sending machines and the receiving machine elements for controlling the latter by the former, and means at each sending machine but controlled by the receiving machine for locking all said controlling elements while the receiving machine is operating.

28. In a system of the class described, the combination with a differentially adjustable controlling device and a distant differentially movable controlled device, of connections between said devices whereby the controlling device determines the operation of the controlled device, and means at the controlling device for indicating that the controlled device is operating.

29. In a system of the class described, the combination with a differentially adjustable controlling device, and a distant differentially movable controlled device, of connections between said devices for determining the movement of the controlled device in accordance with the adjustment of the controlling device, and indicating means at the controlling device actuated by the movement of the controlled device.

30. In a machine of the class described, the combination with a registering device and a rack element for operating it, of a driving motor and an operating bar actuated thereby, a spring normally tending to move said rack element, a projection operable to obstruct said rack element, a magnet for actuating said projection, and contact means controlled by said rack element for energizing said magnet.

31. In a machine of the class described, the combination with a registering device and a rack element for operating it, of an operating bar for said rack element, an electromagnet, devices actuated thereby for causing obstruction of said rack element, a contact device moved by said rack element, a plurality of stationary contacts with all of which said first contact device may engage and a circuit from said contact and including said magnet.

32. In a machine of the class described, the combination with a registering device and a differentially movable device for operating it, of an electromagnet and devices actuated thereby for causing obstruction of said differential device, contact means controlled by said differential device for energizing said magnet at any position of said differential device, and means for engaging and disengaging said differential device and said registering device.

33. In a machine of the class described, the combination with printing mechanism including type carriers, of differentially movable elements for variously positioning said type carriers, an electromagnet and devices actuated thereby for stopping said type carriers in desired differential positions, means for energizing said magnet, a motor for driving said differential elements, and impression means actuated by said motor.

34. In a machine of the class described, the combination with differentially movable elements, and accounting devices controlled thereby, of electric circuits including a plurality of contacts for causing obstruction of said differentially movable elements at desired points, an operating device for said differential elements, a main contact in said circuits and means controlled by said operating device for breaking the circuits at said main contact before said plurality of contacts are operated, to avoid sparking.

35. In a machine of the class described, the combination with accounting devices, of an electric motor for operating said devices, a circuit for said motor including a relay magnet, and means controlled by said relay magnet for indicating at a distance whether or not said motor is operating.

36. In a machine of the class described, the combination with an accounting mechanism and an electric motor for driving the same, of a circuit including said motor and having contact points, an electromagnet and an armature therefor, an arm actuated by said armature and positioned to close said contact points, a locking arm constructed to retain said contact closing arm in operated position, and connections from said driven accounting mechanism for displacing said retaining arm.

37. In a machine of the class described, the combination with a controlling mechanism, of a distant controlled enumerating mechanism with connections for controlling the latter by the former, an operating mechanism for said enumerating mechanism, a circuit including a relay closed while said operating mechanism is operating, and indicating means at the controlling mechanism controlled by said relay.

38. In a machine of the class described, the combination with a controlling mechanism and a distant enumerating means controlled thereby, of a motor for driving said enumerating means, a circuit for said motor, and an indicating device at said controlling mechanism with connections for actuating said indicating device while said motor circuit is effective.

39. In a machine of the class described, the combination with a controlling mechanism and a distant enumerating mechanism controlled thereby, of a relay magnet with connections for energizing it while the enumerating means is operating, and an indicator at the distant controlling mechanism, controlled by said relay magnet.

40. In a machine of the class described, the combination with an enumerating means, of a plurality of separated and independent controlling mechanisms therefor, connections for transmitting details of transactions entered on any of the controlling mechanisms to the enumerating means, differential mechanism in each controlling mechanism for varying as desired the transaction details transmitted at any operation, and means for locking the differential mechanism of the particular controlling mechanism employed, while the enumerating means is operating under control of said particular mechanism.

41. In a machine of the class described, the combination with a plurality of separated and independent controlling mechanisms, each having differential means for entering therein details of transactions, of an enumerating means, connections between each of said controlling mechanisms and said enumerating means for transmitting to said enumerating means the details of each transaction entered on any of the controlling mechanisms, and devices for locking the differential means of the particular controlling mechanism employed, while the enumerating means is operating under control of said particular mechanism.

42. The combination with a sending machine having a series of contacts, of a receiving machine having a series of corresponding contacts, manually operated switch contacts for the sending machine, motor driven switch contacts for the receiving machine, registering mechanism controlled by said motor driven switch contacts, and connecting means intermediate corresponding contact pieces in the sending and receiving machine.

43. The combination with a sending machine, including a series of contact pieces, of switch contacts for establishing contact with the contact pieces, a receiving machine having contact pieces, switch contacts in said machine for establishing contact with these latter contact pieces, connections between the corresponding contact pieces, a counter controlled by the receiving machine switch contacts, and means for preventing any movement of the sending machine switch contacts during the operation of the receiving machine.

44. The combination with a sending machine, including a series of contact pieces, and movable switch contacts for said contact pieces, of a receiving machine having a series of corresponding contact pieces, electrically connected with the contact pieces of the sending machine, switch contacts for the receiving machine, and accounting mechanism controlled by the switch contacts of the receiving machine, driving mechanism for the switch contacts of the receiving machine, and a lock for the switch contacts of the sending machine, controlled by the driving mechanism of the receiving machine.

45. The combination with a sending machine, of a receiving machine, a motor and a circuit therefor for operating the receiving machine, means for closing the circuit to the motor from the sending machine, means for holding the circuit closed until the receiving machine has made a complete operation, and means for preventing a second operation of the sending machine before the previous operation of the receiving machine has been completed.

46. The combination with a sending machine, including a series of setting levers and a series of contacts for each lever, of a receiving machine having a series of contacts connected to the corresponding contacts at the sending machine, accounting mechanism in the receiving machine, means controlled by the contacts for operating the accounting mechanism, latches for the setting levers of the sending machine, and electrically controlled operating means for said latches for preventing movement of the setting levers while the receiving machine is operating.

47. In a machine of the class described, the combination with a plurality of controlling mechanisms, each including differentially movable elements, a distant enumerating means, also having differentially movable elements, connections from the differential elements of all the controlling mechanisms to the differential elements of the enumerating means whereby the latter may be controlled by the former, and means for locking the differential elements of the particular controlling mechanism employed, while the enumerating means is operating under control of said particular mechanism.

48. In a machine of the class described, the combination with a plurality of controlling mechanisms, each including differentially movable elements, of a distant enumerating means also including differentially movable elements, connections from the differential elements of all the controlling mechanisms to the differential elements of the enumerating means whereby the latter may be controlled by the former, a main operating mechanism for the enumerating means, devices in each controlling mechanism for locking the differential elements thereof, and connections actuated by the enumerating means main operating mechanism for actuating the locking devices in any particular controlling mechanism to lock the differential elements thereof while said enumerating means is operating under control of said particular mechanism.

49. In a system of the character described, the combination with a receiving machine having a plurality of registering mechanisms mounted therein, and actuators common to said registering mechanisms, of a sending machine, including adjustable elements, and means, controlled by the adjustable elements, for selecting the registering mechanism in the receiving machine to be actuated by the actuators and for controlling the extent of movement of said actuators.

50. In a system of the character described, the combination with a receiving machine having a plurality of registering mechanisms mounted therein, and actuators common to said registering mechanisms, of a sending machine having adjustable elements, and electrical devices controlled by the adjustable elements for selecting the registering mechanism in the receiving machine to be actuated by the actuators and for controlling the extent of movement of said actuators.

51. In a system of the character described, the combination with a receiving machine having a plurality of registering mechanisms mounted therein, and actuators common to said registering mechanisms but normally out of operative relation with all of said mechanisms, of a sending machine, including adjustable elements, and means controlled by the adjustable elements for establishing operative relation between the actuators and any one of the registering mechanisms and for controlling the extent of movement of said actuators.

52. In a system of the character described, the combination with a receiving machine having registering mechanisms mounted therein, and actuators for said mechanism normally out of operative relation therewith, of a sending machine, including adjustable elements, and means controlled by the adjustable elements for establishing operative relation between the actuators and the registering mechanism and for controlling the extent of movement of said actuators.

53. In a store service system, the combination with a receiving station having a plurality of departmental totalizers upon each of which is entered transactions occurring in the corresponding department of the store and a grand totalizer for accumulating the total of all of the departmental totalizers; of a plurality of sending machines, one for each department, and means controlled by each sending machine for actuating its corresponding departmental totalizer and the grand totalizer in the receiving machine.

54. In a store service system, the combination with a receiving station having a plurality of departmental totalizers upon each of which is entered transactions occurring in the corresponding department of the store, and a grand totalizer for accumulating the total of all of the departmental totalizers, of a plurality of sending machines, one for each department, and electrical connections between the sending machines and the departmental and the grand totalizers constructed to actuate one of the departmental totalizers and the grand totalizer upon the actuation of any one of the sending machines.

55. In a store service system, the combination with a receiving station having a plurality of departmental totalizers upon each of which is entered transactions occurring in the corresponding department of the store, a grand totalizer for accumulating the total of all of the departmental totalizers, and actuators common to said departmental and grand totalizers, of a plurality of sending machines, one for each department, and means controlled by each sending machine for establishing operative relation between its corresponding departmental totalizer and the grand totalizer and the actuators therefor.

56. In a store service system, the combination with a receiving station having a plurality of departmental totalizers upon each of which is entered cash transactions occurring in the corresponding department of the store, a grand totalizer for accumulating the total of all of the departmental totalizers, and a credit totalizer for accumulating the total of the credit transactions occurring in all of the departments, of a plurality of sending machines, one for each department, and means controlled by each sending machine for determining whether a departmental totalizer and the grand totalizer are to be actuated or the credit totalizer.

57. In a store service system, the combination with a receiving station having a plurality of departmental totalizers, upon each of which is entered cash transactions occurring in the corresponding department of the store, a grand totalizer for accumulating the total of all of the departmental totalizers, and a credit totalizer for accumulating the total of the credit transactions occurring in all of the departments, of a plurality of sending machines, one for each department, and electrical connections between the sending machines and the various totalizers of the receiving station and controlled by said sending machines, for actuating the departmental and grand totalizers or the credit totalizer, depending upon the condition of the operated sending machine.

58. In a store service system, the combination with a receiving station having a plurality of departmental totalizers, upon each of which is entered cash transactions occurring in the corresponding department of the store, a grand totalizer for accumulating the total of all of the departmental totalizers, a credit totalizer for accumulating the total of the credit transactions occurring in all of the departments, and actuators common to all of said totalizers and normally out of operative relation therewith, of a plurality of sending machines, one for each department, and means controlled by any one of the sending machines for establishing operative relation between its corresponding departmental totalizer and the grand totalizer and the actuators or between the latter and the credit totalizer.

In testimony whereof I affix my signature in the presence of two witnesses.

CHARLES F. KETTERING.

Witnesses:
  ROY C. GLASS,
  CARL J. BEUST.